United States Patent
Banerjee et al.

(10) Patent No.: US 8,745,614 B2
(45) Date of Patent: *Jun. 3, 2014

(54) METHOD AND SYSTEM FOR FIRMWARE UPGRADE OF A STORAGE SUBSYSTEM HOSTED IN A STORAGE VIRTUALIZATION ENVIRONMENT

(75) Inventors: Arindam Banerjee, Bangalore (IN); Pradeep Radhakrishna Venkatesha, Bangalore (IN); John Thomas, Bangalore (IN)

(73) Assignee: LSI Corporation, Milpitas, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/107,157

(22) Filed: May 13, 2011

(65) Prior Publication Data

US 2012/0291021 A1 Nov. 15, 2012

(51) Int. Cl.
*G06F 9/44* (2006.01)
*G06F 9/445* (2006.01)

(52) U.S. Cl.
USPC ........... 717/173; 717/172; 717/168; 717/174; 717/178

(58) Field of Classification Search
None
See application file for complete search history.

(56) References Cited

U.S. PATENT DOCUMENTS

| | | | | |
|---|---|---|---|---|
| 6,668,374 B1 * | 12/2003 | Sten et al. | | 717/173 |
| 6,698,017 B1 * | 2/2004 | Adamovits et al. | | 717/168 |
| 7,380,113 B2 * | 5/2008 | Ebsen et al. | | 713/1 |
| 7,991,988 B2 * | 8/2011 | Chen | | 713/1 |
| 8,095,525 B2 * | 1/2012 | Le et al. | | 707/705 |
| 8,201,161 B2 * | 6/2012 | Challener et al. | | 717/168 |
| 8,539,033 B2 * | 9/2013 | Mann et al. | | 709/206 |
| 2008/0109798 A1 | 5/2008 | Gavens et al. | | |
| 2008/0244553 A1 * | 10/2008 | Cromer et al. | | 717/168 |
| 2008/0250222 A1 * | 10/2008 | Gokhale et al. | | 711/203 |
| 2010/0241838 A1 * | 9/2010 | Cohen et al. | | 713/2 |
| 2010/0287544 A1 * | 11/2010 | Bradfield et al. | | 717/172 |
| 2011/0131447 A1 * | 6/2011 | Prakash et al. | | 714/19 |
| 2011/0131563 A1 * | 6/2011 | Ohama et al. | | 717/168 |
| 2011/0296197 A1 * | 12/2011 | Konetski et al. | | 713/189 |
| 2011/0296410 A1 * | 12/2011 | Lo et al. | | 718/1 |
| 2012/0089972 A1 * | 4/2012 | Scheidel et al. | | 717/168 |
| 2012/0117555 A1 * | 5/2012 | Banerjee et al. | | 717/168 |
| 2012/0117562 A1 * | 5/2012 | Jess et al. | | 718/1 |
| 2012/0240114 A1 * | 9/2012 | Muller | | 718/1 |

* cited by examiner

*Primary Examiner* — Isaac Tecklu
*Assistant Examiner* — Hossain Morshed

(57) ABSTRACT

A method and controller device for upgrading firmware in a virtualized storage environment having a virtual machine manager, guest virtual machines and a storage device. The method includes downloading a new firmware solution bundle to a first logical area of the storage device, and installing the new firmware containing the virtual machine manager and guest virtual machines. The installation includes moving the solution bundle to a scratch area carved out of a P-cache area in the storage device, extracting the new firmware, copying the new firmware to the first logical area, marking the first logical area as the Active area, and marking the second logical area as the Staging area. The method also includes rebooting the virtualized storage environment with the installed new firmware, committing to the new firmware if the installation is successful, and rolling back the firmware version from the new firmware to the current firmware if the installation is not successful.

18 Claims, 9 Drawing Sheets

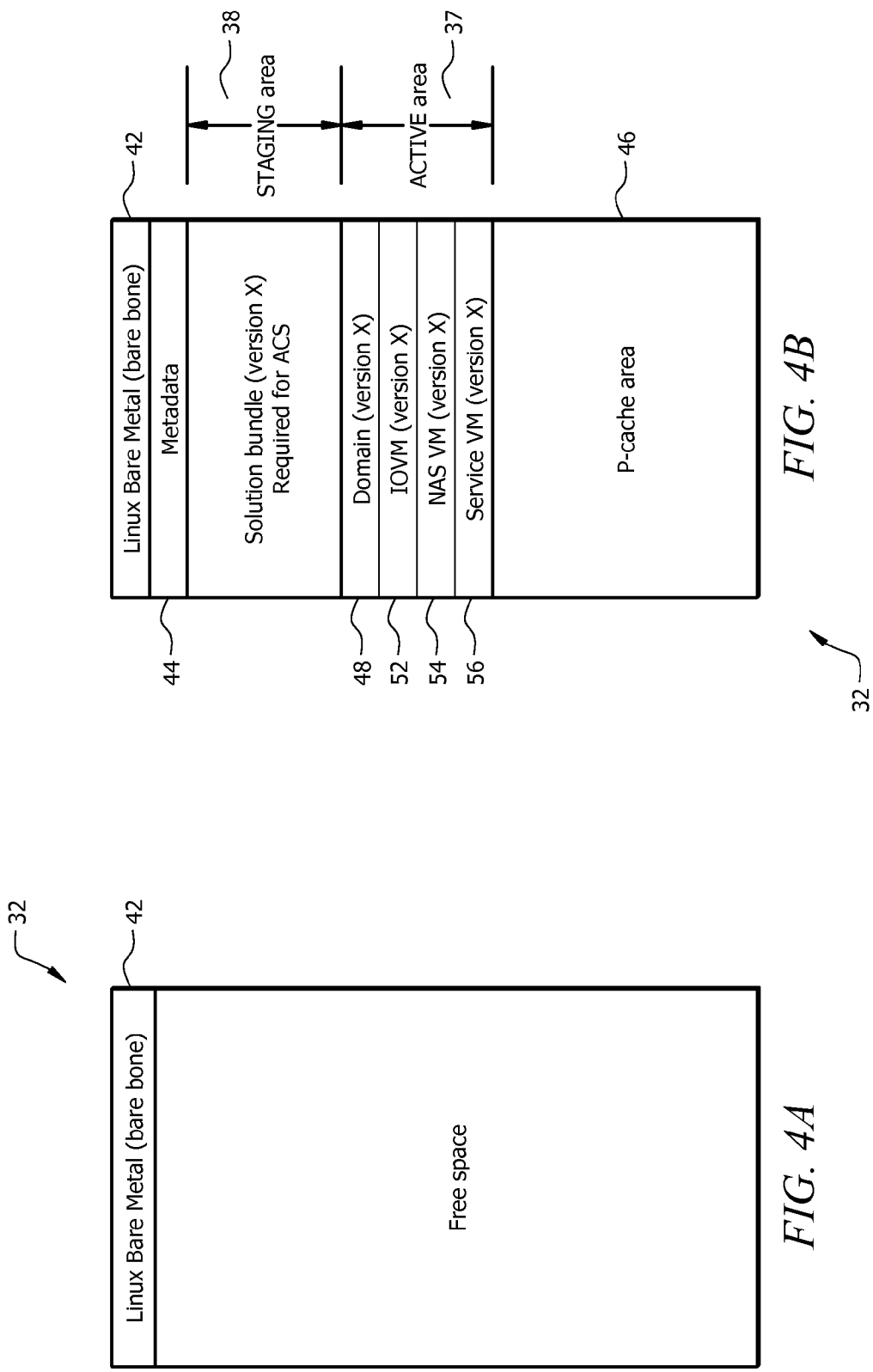

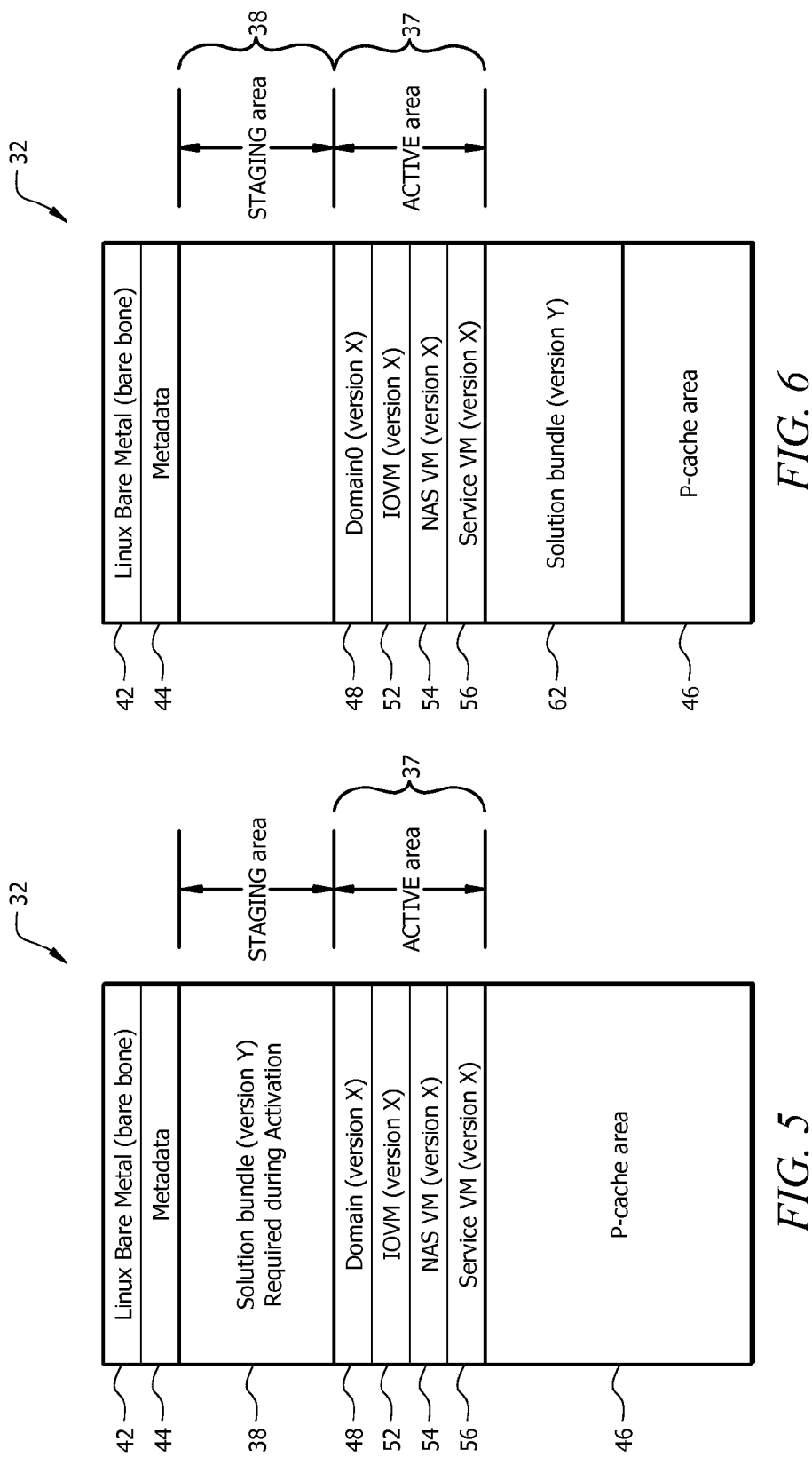

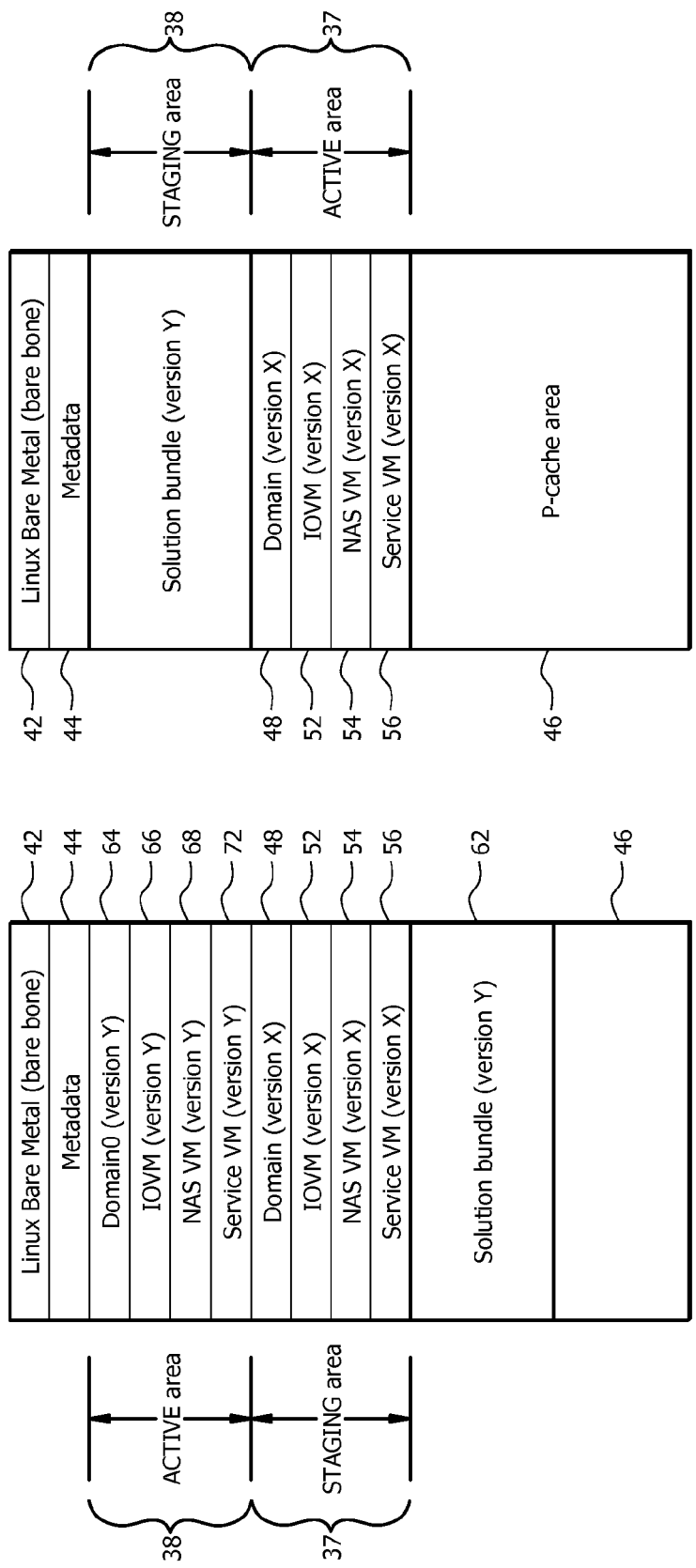

METHOD AND SYSTEM FOR FIRMWARE UPGRADE OF A STORAGE SUBSYSTEM HOSTED IN A STORAGE VIRTUALIZATION ENVIRONMENT

BACKGROUND OF THE INVENTION

1. Field of the Invention

The invention relates to storage devices of subsystems within a storage virtualization environment. More particularly, the invention relates to firmware upgrades of storage systems within a storage virtualization environment.

2. Description of the Related Art

Storage virtualization environments typically involve logical space (e.g., a storage subsystem) within a physical (disk) storage system. In a typical storage virtualization environment, there are multiple virtual machines (VMs) providing separate but dependent storage functions within a disk array controller or storage controller, such as a RAID (redundant array of inexpensive disks) controller. A hypervisor or other suitable device or process configures the virtual machines in the storage virtualization environment.

A disk array subsystem that hosts a storage virtualization environment (in the form of virtual machines running on the platform) allows the integration of multiple storage applications within the subsystem to form a unified storage subsystem. One such example of a unified storage subsystem is a product that supports both file level and block level input/output (I/O) operations to the subsystem. In such a subsystem, it is important to have a system firmware upgrade mechanism that upgrades the firmware or software for all storage applications running within the virtualization environment as an atomic operation, while also keeping the subsystem online and accessible to external hosts or initiators when the upgrade is being performed for the entire subsystem. That is, the upgrades should appear instantaneous to the rest of the system, and either be completely implemented if successful or not implemented at all if unsuccessful. If the unified system, which includes all of the virtual machines, is not upgraded atomically, there is a chance that different virtual machines will run different versions of the system firmware at a particular point in time (e.g., during upgrades), thus resulting in firmware version co-validation issues across different versions. The subsystem also should be capable of a rollback operation to the previous running version of the firmware in case the upgrade fails, thereby requiring the older version of the firmware to be preserved until the upgrade is completed and committed. Also, the system (or disk array controller) typically is provided with an attached storage device (e.g., in the form of a flash disk) whose storage capacity is limited. Therefore, such functional requirements and storage space limitations necessitate efficient if not optimal handling of the relatively limited storage space available on the storage device for storing the code image of the system firmware.

Conventional methods and mechanisms exist for upgrading firmware, in phases, and restoring firmware in-situ to compensate for failed firmware upgrades, e.g., in a non-volatile memory. In such methods and mechanisms, firmware can be upgraded and restored as the non-volatile memory remains functioning. For example, such methods and mechanisms involve designating a first copy of firmware for accessing and designating a second copy of the firmware for upgrading, which allows access to one or more firmware instructions from the first copy while upgrading the second copy with new firmware.

SUMMARY OF THE INVENTION

The invention is embodied in a method and controller device for upgrading firmware in a virtualized storage environment. The virtualized storage environment includes a virtual machine manager, one or more guest virtual machines, and a storage device. The storage device includes a first logical area having stored therein a current firmware version solution bundle and marked as a Staging area, a second logical area having stored therein a current firmware version for the virtual machine manager and the guest virtual machines and marked as an Active area, and a P-cache area. The method includes downloading a new firmware version solution bundle to the first logical area of the storage device, and installing the new firmware version for the virtual machine manager and the guest virtual machines. The new firmware installation includes moving the new firmware version solution bundle to a scratch area carved out of the P-cache area, extracting from the new firmware solution bundle the new firmware version for the virtual machine manager and the guest virtual machines, copying the new firmware version for the virtual machine manager and the guest virtual machines to the first logical area, marking the first logical area as the Active area, and marking the second logical area as the Staging area. The method also includes rebooting the virtualized storage environment with the installed new firmware version, and committing to the new firmware version for the virtual machine manager and the guest virtual machines if the installation of the new firmware version is successful, or rolling back the firmware version from the new firmware version to the current (previous) firmware version for the virtual machine manager and the guest virtual machines if the installation of the new firmware version is not successful.

BRIEF DESCRIPTION OF THE DRAWINGS

FIG. 4A is a schematic view of the storage layout of the storage device before a first time installation of a firmware solution bundle;

FIG. 4B is a schematic view of the storage layout of the storage device after the completion of a first time installation of a firmware solution bundle;

FIG. 5 is a schematic view of the storage layout of the storage device after the completion of downloading a new firmware version solution bundle;

FIG. 6 is a schematic view of the storage layout of the storage device during and after the completion of the firmware extraction from the new firmware solution bundle;

FIG. 9A is a schematic view of the storage layout of the storage device after the completion of the firmware installation but before committing to the firmware upgrade;

FIG. 9B is a schematic view of the storage layout of the storage device after a commit failure and a firmware rollback;

DETAILED DESCRIPTION OF EXEMPLARY EMBODIMENTS

Figure 1:
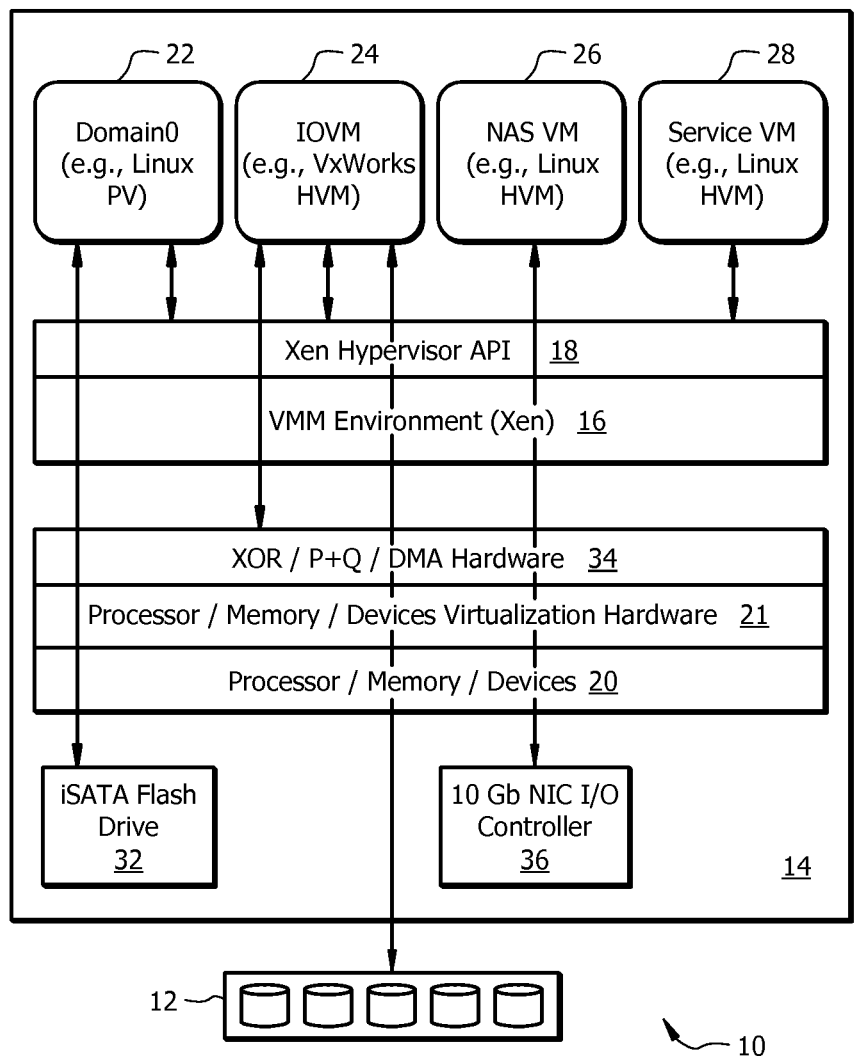
FIG. 1 is a schematic view of a virtualized storage environment.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

As used in this description, the terms "component," "module," and "system," are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more. In addition, these components may execute from various computer readable media having various data structures stored thereon. The components may communicate by way of local and/or remote processes, such as in accordance with a signal having one or more data packets, e.g., data from one component interacting with another component in a local system, distributed system, and/or across a network, such as the Internet, with other systems by way of the signal.

Referring now to FIG. 1, shown is a virtualized storage environment 10, such as a virtualized storage environment suitable for use according to an embodiment of the invention. The virtualized storage environment 10, which is running multiple storage applications, includes a data storage array, typically in the form of a plurality of disk drive units (such as a plurality of Serially attached SCSI (SAS) disk drives) stored within one or more disk drive expansion trays 12. Each data storage array typically includes at least one disk array controller or storage controller 14, and often includes a second, alternate controller as part of a dual controller configuration.

The storage controller 14 typically includes a Virtual Machine Management (VMM) module 16, which is a software module that abstracts and provisions the hardware resources for the virtual machines (VMs) in the storage controller 14. Xen is an example of a VMM environment or module. The VMM module 16 communicates with all virtual machines in the storage controller 14 via a suitable hypervisor application program interface (API) 18. The hypervisor API 18 provides virtualization, thus allowing multiple storage applications to be run simultaneously within the hardware platform in the form of virtual machines. The storage application can be an NAS filer or a gateway product in addition to the RAID block functionality, thereby enabling users file-based access to the storage array in addition to the block access to the storage array. The storage controller 14 also includes the appropriate processor, memory element(s) and device(s) 20, and the appropriate corresponding processor, memory element and device virtualization hardware 21, for proper operation of the storage controller 14.

To provide the above functionality, multiple virtual machines are running within the virtualized environment 10 on the subsystem. For example, the storage controller 14 includes four (4) virtual machines, e.g., a Domain0 (also referred to as Dom0) virtual machine 22, an input/output (IO) virtual machine (IO VM or IOVM) 24, a Network Attached Storage virtual machine (NAS VM) 26 and a Service virtual machine (Service VM) 28. Typically, each virtual machine hosts a different functionality. That is, each virtual machine is a separate instance of an operation system that runs various services or functionalities.

The Domain0 VM 22 can be a privileged or para-virtualized (PV) virtual machine for Linux or other suitable operating system. Para-virtualized generally describes an Operating System that is modified to run efficiently with Xen. Thus, the Domain0 VM 22 can be a virtual machine that works closely with Xen to provide services for the virtualized storage environment 10. The Domain0 VM 22 typically manages or controls the virtualized storage environment 10 as the designated VMM or Virtual Machine Manager. The Domain0 VM 22 typically is configured to start and stop other virtual machines. Also, the Domain0 VM 22 owns or controls one or more storage elements or storage devices 32, such as one or more iSATA (Serial Advanced Technology Attachment) flash drives, within or coupled to the storage controller 14. The storage device 32 typically is used for boot images of all of the virtual machines.

The IO virtual machine (IOVM) 24 provides RAID (redundant array of inexpensive disks) services for other virtual machines. The IOVM 24 typically is running as a "domain U" (or domU), i.e., a guest virtual machine, and will be hosting the RAID application (for block-based access). Therefore, the IOVM 24 has direct access to a suitable direct memory access (DMA) hardware component 34, such as the XOR/P+Q DMA hardware. Also, the IOVM 24 has direct access to the back end disk drives, which typically are located in the disk drive expansion trays 12. The IOVM 24 can be a VxWorks Hardware Virtual Machine (HVM) or other suitable virtual machine. In general, an HVM is an Operating System that is unmodified and has no knowledge of the Operating System being abstracted by a VMM module, e.g., the VMM module 16.

The NAS virtual machine (NAS VM) 26 provides file services and has direct access to a suitable input/output (I/O) controller 36, e.g., a 10 Gb NIC I/O Controller. The NAS VM 26 also typically runs as a domU (guest virtual machine) and hosts an NAS gateway application (to provide file-based access). The NAS VM 26 can be a Linux HVM or other suitable virtual machine.

The Service virtual machine (Service VM) 28, e.g., a Linux HVM, is used for systemwide software services, such as providing centralized logging. Another systemwide software service in which the Service VM 28 is used is coordinating management access to the controller. The Service VM 28 also typically runs as a domU (guest virtual machine) and hosts various management applications.

As mentioned hereinabove, the virtualized environment 10 includes an attached storage device 32, e.g., one or more flash drives or flash disks. The storage capacity of the storage device 32 is relatively limited and hence the storage space of the storage device 32 needs to be used and managed optimally because not only does this storage space provide storage capacity for the active or running (boot) partition for all of the virtual machines but also provides storage capacity for storing the firmware solution bundle, which is a composite bundle of the code image of all of the virtual machines in archived format. The storage space of the storage device 32 also provides storage for the unwritten contents of the user data (also known as dirty data) cache memory, e.g., in the event of an AC power outage to the storage system. Therefore, the storage space of the storage device 32 should be managed optimally to allow the existence of the active partitions for all virtual machines, the solution bundle required for a firmware upgrade and auto code synchronization purposes and the cache offload area.

More specifically, with respect to all of the attached storage devices, the storage device residing in the first slot typically is used for storing the code images for all of the storage applications. Also, the root file system of the Linux virtual machines typically is stored in the same storage device. Also, a portion of the same storage device typically is reserved for cache memory offload, which is a process of destaging cache memory data to the storage device temporarily during a system power outage.

Apart from storing the root partitions for each of the virtual machines, approximately half (50%) of the storage space from the storage device 32 typically is reserved for cache memory offload purposes. Such portion of the storage device 32 is accessed by the IOVM 24 as a para-virtualized block device by using a back end block driver running in the Domain0 VM 22 and a front end block driver running in the IOVM 24.

Many types of firmware, including Open Storage Architecture (OSA) firmware, typically are packaged in such a way that that the firmware for the individual virtual machines is wrapped around in a RPM (RedHat Package Manager) package management system format. The RPMs of each virtual machine typically are packaged into a single solution bundle, which typically is in an archived format. The single solution bundle typically is identified with a firmware version number. Each of the individual virtual machines identifies itself with the OSA firmware version number. This single solution bundling mechanism ensures that there is no runtime co-validation issue validating the compatibility of each piece of firmware with other firmware versions.

Figure 2:
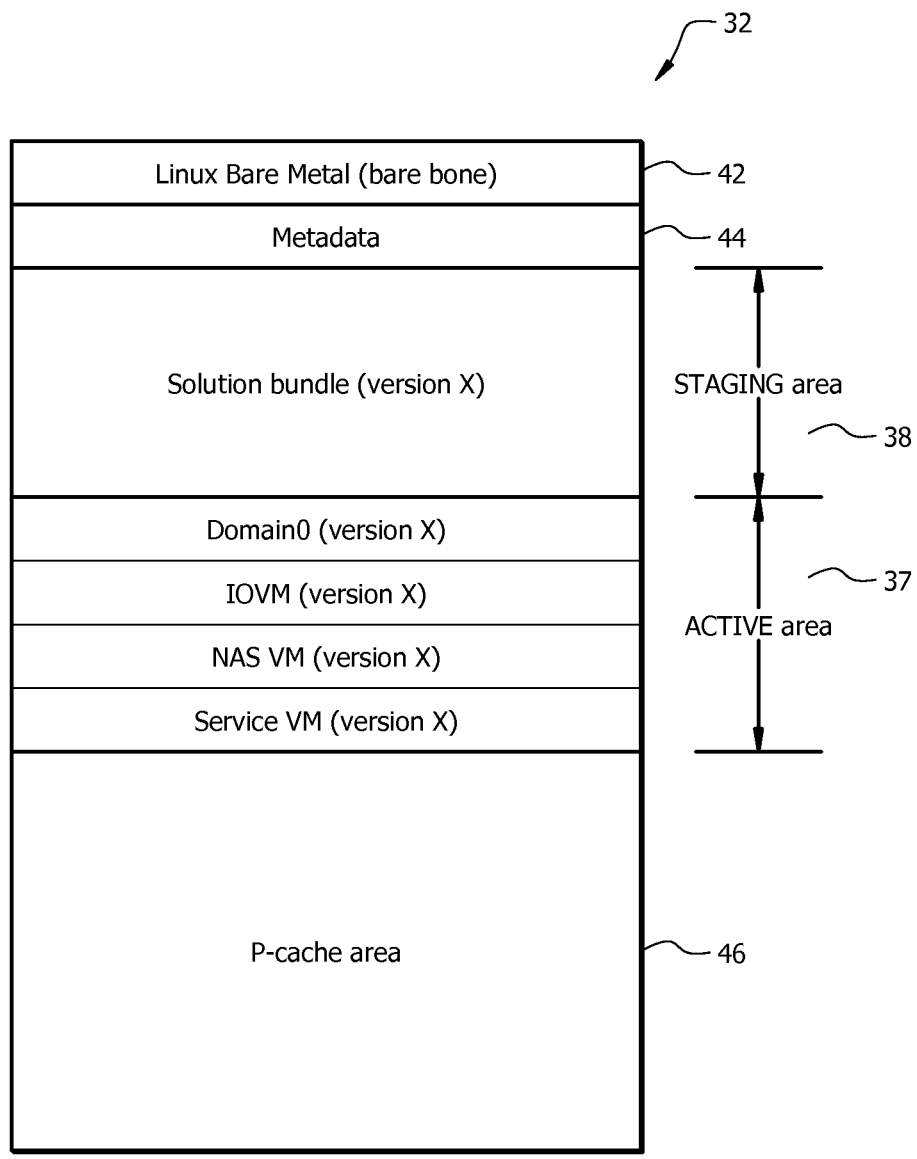
FIG. 2 is a schematic view of the storage layout of a storage device, such as a flash drive storage device, attached to the controller in the virtualized storage environment of FIG. 1.

Referring now to FIG. 2, shown is a schematic view of the storage layout of a storage device 32, such as a flash drive or flash disk storage device. The use of the storage space in the storage device 32 should be properly managed or optimized to host the boot and root partitions for each of the individual virtual machines as well as a copy of the solution bundle. The boot and root partitions are active partitions from which the virtual machines are launched (i.e., initialized), and occupy a logical area in the storage device 32 marked as the Active area 37. Also, it is necessary to keep aside a suitable amount of storage space for the solution bundle. The solution bundle occupies another logical area, which is marked as the Staging area 38. The Staging area 38 is used for downloading a new version of the firmware (for upgrade purposes) as well as for code synchronization purposes between a pair of redundant controllers (due to controller sparing).

The storage layout of the storage device 32 also includes a storage area 42, which is a Linux Bare Metal (bare bone) partition used for first time installation and system backup and recovery processes. The storage layout of the storage device 32 also includes a storage area 44 for system metadata used by the storage controller 14.

Apart from these storage areas, the storage layout of the storage device 32 also includes a P-cache area 46, which is used to store cache memory contents on a power outage, a portion of which is carved out and used as a scratch area during the installation process, as will be discussed in greater detail hereinbelow. During installation, the RPM for each of the virtual machines is extracted from the solution bundle. Also, each of the virtual machine RPMs is subjected to CRC validation. Finally the individual RPMs are installed to their designated locations, i.e., the appropriate disk partitions within the flash drive storage device 32. A temporary storage area on the storage device 32, i.e., the scratch area, is used to perform these operations during installation.

According to embodiments of the invention, a method and storage controller device provides for the online, non-disruptive upgrade of the firmware of multiple storage applications, as well as the booting of the different applications atomically from the new firmware version in a non-disruptive manner. The firmware upgrade and booting, which uses optimal handling of the relatively limited storage space available in the flash drive storage device, prevents run-time issues with firmware version compatibility. The methods according to embodiments of the invention can be used for non-disruptive firmware upgrades for any embedded system running on a virtualized environment that hosts multiple applications and that requires the system to be online when the new firmware is downloaded and installed. Embodiments of the invention ensure that all of the virtual machines are upgraded simultaneously, and booted with the new firmware version during the upgrade. If any of the virtual machines fail to upgrade to the newer version of the firmware, the upgrade is failed and the system performs a rollback to the previous running version of the firmware. The method also ensures that the disk array subsystem is online and accessible to external initiators during the upgrade and adheres to the firmware download requirements.

As will be discussed in greater detail hereinbelow, the method and storage controller device according to embodiments of the invention include a number of features. Such features include the ability to atomically update multiple pieces of firmware for different storage applications running on multiple virtual machines within a virtualized hypervisor environment. Also, all of the virtual machines in the virtualized environment can be booted from the new firmware version in an atomic manner, so that none of the virtual machines run mismatched firmware versions at any point in time.

Embodiments of the invention also enhance or optimize the use of the storage capacity within the storage device by using at least a portion of the cache memory offload area as a scratch area during the firmware installation. Also, embodiments of the invention use virtual disk or virtual block device concepts to share the same disk across multiple virtual machines that are hosting different Operating Systems. Embodiments of the invention use a logical volume manager (LVM), such as a Linux LVM, for creating the boot partitions. The LVM provides the flexibility of installing individual images to the designated partition based on a known partition label. The LVM also provides the ability to resize the partitions across different versions. The partition sizes are chosen based on the RPM payload.

Also, embodiments of the invention provide the ability to perform a rollback to the previous running firmware version in case of a firmware upgrade installation failure.

According to embodiments of the invention, to provide a firmware upgrade of the multiple storage applications in a virtualized storage environment, the firmware packages for the virtual machines in the virtualized storage environment (including the Domain0 VM 22) are installed into their respective partitions within the storage device 32. The firmware upgrade includes downloading the new firmware solution bundle to the Staging area 38 of the storage device 32. The firmware upgrade also includes installing the new firmware images to their respective partitions within the storage device 32. The firmware upgrade also includes rebooting the system with the new firmware version and, if the upgrade was successful, committing to the new firmware version. According to embodiments of the invention, downloading the solution bundle is a distinct process that can be performed separately while the remaining processes are performed atomically, to adhere to the firmware upgrade requirements.

Figure 3:
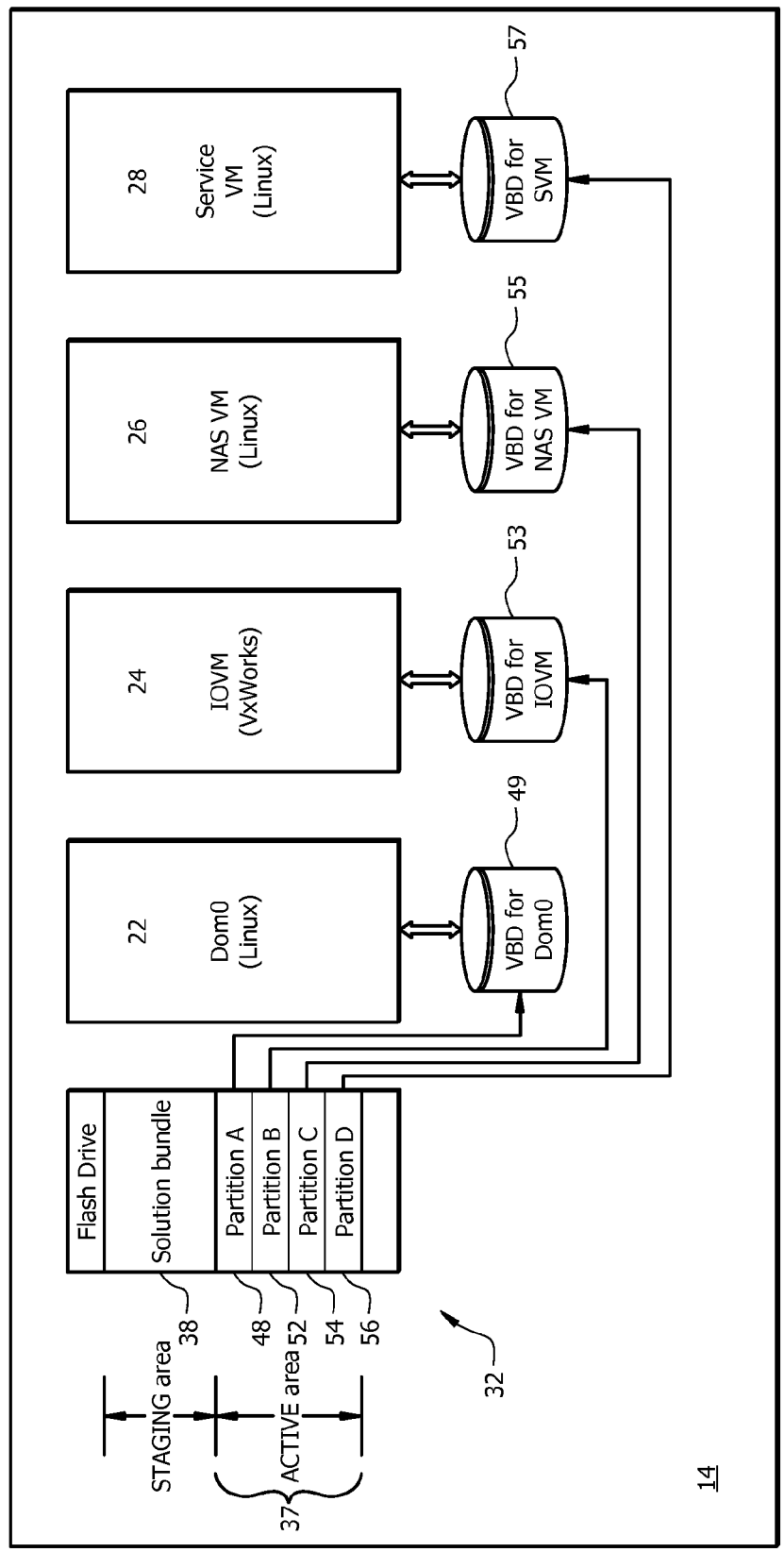
FIG. 3 is a schematic view of the partitioning of the storage device for the different virtual machines in the virtualized storage environment of FIG. 1.

Referring now to FIG. 3, shown is a schematic view of the partitioning of the storage device 32 for the different virtual machines in the virtualized storage environment 10. The current running version of the firmware code is stored within the Active area 37. The Active area 37 resides on only one storage device 32, e.g., in the case where multiple storage devices are attached to the controller 14, e.g., via the controller board 36. The Active area 37 is not striped across more than one storage device. As will be discussed in further detail hereinbelow, the Active area 37 is further partitioned into individual partitions for each of the virtual machines running on the virtualized storage environment platform. The code image for each virtual machine resides within its respective individual partition. Each virtual machine therefore boots off of the partition allocated for that respective virtual machine. Each of these individual partitions also can be referred to as a VBD (Virtual Block Device) for its respective virtual machine. For example, the Active area 37 can include a first partition 48 (Partition A) that functions as a first VBD 49 for the Domain0 VM 22, a second partition 52 (Partition B) that functions as a second VBD 53 for the IOVM 24, a third partition 54 (Partition C) that functions as a third VBD 55 for the NAS VM 26, and a fourth partition 56 (Partition D) that functions as a fourth VBD 57 for the Service VM 28. In this manner, for each virtual machine, the corresponding VBD is or functions as the particular virtual machine's own view of the storage device 32.

As discussed hereinabove, the storage device 32 is further partitioned into the Staging area 38 for storing the downloaded image for a firmware installation or upgrade. The Staging area 38 is a single partition that stores the entire firmware solution bundle image. For an OSA-based firmware solution and other firmware solutions, the Staging area 38 is an area within the storage device 32 that is used for intermediate storage of the downloaded solution bundle image prior to its installation. After installation of the firmware solution bundle image to the Staging area 38, the "new" Staging area 38 retains the solution bundle image for the actively running firmware. This solution bundle image is used for code synchronization purposes between a redundant pair of controllers, i.e., to allow the redundant pair of controllers to sync to a common version of firmware code.

As will be discussed in greater detail hereinbelow, whenever a new solution bundle image (i.e., for a new firmware version) is downloaded to the Staging area 38, the new solution bundle image overwrites the current solution bundle image being stored in the Staging area 38. A subsequent firmware installation of the new firmware takes place within the current Staging area, which then becomes the new Active area. The current Active area then becomes the new Staging area. However, in the case of a firmware installation failure, the newly installed firmware is discarded and the controller reboots from the current Active area (new Staging area) again.

Referring now to FIG. 4a, shown is a schematic view of the storage layout of the storage device 32 before a first time installation of a firmware solution bundle (e.g., firmware version X). Before a first time installation of a firmware solution bundle, the storage device 32 is pre-loaded with a bare-bone Linux Bare Metal distribution 42. The Linux Bare Metal distribution 42 enables the system to be booted the first time. The Linux Bare Metal distribution 42 includes other basic Linux utilities, such as a suitable utility to copy the solution bundle over an appropriate network connection to the storage device 32 or to other appropriate components in the virtualized storage environment 10. The Linux Bare Metal distribution 42 also includes a suitable bootloader utility and basic RPM-based utilities for installation.

A number of processes are involved as part of the first time installation of a firmware solution bundle. First, an administrator or other appropriate person can login to the controller shell and issue a command to copy the solution bundle to the storage controller 14 via an appropriate network and network data transmission protocol, such as scp (Secure Copy) or ftp (File Transfer Protocol). Upon transmission of the solution bundle to the storage controller 14, a read-only memory (RAM) disk is created and the solution bundle is copied to the RAM disk.

Once the solution bundle is copied to the RAM disk, a top-level install script within the solution bundle is invoked. The top-level install script for the solution bundle verifies the integrity of the solution bundle, e.g., using cyclic redundancy check (CRC) or other suitable verification technique. Once the top-level install script for the solution bundle verifies the integrity of the solution bundle, the top-level install script for the solution bundle creates a logical disk partition in the storage device 32 for the solution bundle and then copies the solution bundle over to the appropriate logical disk partition in the storage device 32.

Once the solution bundle is copied to the partition in the storage device 32, the solution bundle is extracted to generate the individual RPMs. Once the solution bundle is extracted to generate the individual RPMs, the install scripts are invoked to verify the integrity of all of the individual virtual machine images. Once the integrity of all of the individual virtual machine images has been verified, the install scripts create a logical disk partition for the Domain0 VM 22 and the guest virtual machines (e.g., the IOVM 24, the NAS VM 26 and the Service VM 28).

Once the install scripts create the logical disk partition for the Domain0 VM 22 and the guest virtual machines, the install scripts install the Hypervisor+Domain0 image onto the appropriate logical partition created for the Hypervisor+Domain0 image. Then, the install scripts update the appropriate bootloader package in the hypervisor environment, such as the grub (GRand Unified Bootloader) bootloader package. Once the appropriate bootloader package has been updated, the install scripts reboot the controller 14.

Upon reboot, the controller comes up in a virtualized (hypervisor) environment. The Domain0 VM 22 sets up the initial configuration (if required), installs the RPMs for the guest virtual machines within their respective partitions on the storage device 32, and launches the guest virtual machines (e.g., the IOVM 24, the NAS VM 26 and the Service VM 28). According to embodiments of the invention, the logical partitions that host the individual virtual machine images are marked as the Active area 37, and the logical partition that stores the solution bundle is marked as the Staging area 38.

The logical disk partitions created for the individual virtual machine images are LVM (Logical Volume Manager) partitions. Each virtual machine has its own view of the storage device 32 through its corresponding LVM-backed partition. As discussed hereinabove, each LVM partition also can be referred to as a VBD (virtual block device) for its respective virtual machine.

As part of the solution bundle installation process, the RPM install script first copies the bootable image for the respective virtual machine from the extracted solution bundle to the designated VBD for the virtual machine. The standard UNIX-based utility 'dd' (disk dump), or other appropriate utility, is used to copy the image, e.g., in the form of multiple blocks, to the designated VBD for the virtual machine.

It should be noted that both the Active area 37 and the Staging area 38 contain the same firmware version. The Active area 37 contains the installed virtual machine images, while the Staging area 38 contains the un-extracted solution bundle. The un-extracted solution bundle is used for automatic code synchronization purposes when a spare controller (running a different firmware version) is inserted into the data storage array. The virtual machine images from the Active area 37 cannot be used for code synchronization purposes because the data may not be in sync with the file system cache memory on the active partition. Using the LVM backed partitions over raw disk partitions or image (.img) files provides flexibility when managing the VBD for each virtual machine. Also the performance of LVM backed partitions when using the UNIX-based utility 'dd' typically is significantly greater than for raw partitions.

Referring now to FIG. 4b, shown is a schematic view of the storage layout of the storage device 32 after the completion of a first time installation of the firmware solution bundle (e.g., version X), as just described. FIG. 4b also shows the storage layout of the storage device 32 before a new firmware version download. Referring now to FIG. 5, with continuing reference to FIG. 4, shown is a schematic view of the storage layout of the storage device 32 after the completion of downloading a new firmware version (e.g., version Y). As can be seen, before a firmware download, the Staging area 38 contains the solution bundle version X required for Auto Code Synchronization (see FIG. 4a). However, after the firmware download, the Staging area 38 contains the solution bundle version Y. It should be understood that downloading a new firmware version does not include and is a separate process from installing and upgrading the downloaded new firmware.

A number of processes are involved as part of the new firmware installation. First, the P-cache area 46 of the storage device 32 is claimed from the IOVM and a scratch area is created for the firmware installation. For example, claiming the P-cache area 46 includes taking temporary ownership of the block device by the virtual machine manager or Domain0 and also mounting a file system on the block device. Once the P-cache area 46 has been claimed for the firmware installation, the current solution bundle (version X) is moved from the Staging area 38 to the P-cache area 46 and the new solution bundle (version Y) is copied to the existing or current Staging area 38. Prior to the P-cache area being claimed for the firmware installation, write caching should be disabled for all volumes in the storage array so that there exists no unwritten data in cache memory that can be destaged/offloaded to this area by the IOVM virtual machine during a power outage.

Once the current solution bundle (version X) has been moved to the P-cache area 46, the individual virtual machine images (RPMs) are extracted from the solution bundle. Once this extraction has occurred, LVM partitions and LVM logical volumes are created for each virtual machine. Once the LVM partitions and LVM logical volumes have been created for each virtual machine, the Domain0 image is installed to the designated LVM logical volume identified by the volume label.

Once the Domain0 image is installed to the designated LVM logical volume identified by the volume label, the appropriate bootloader package in the hypervisor environment (e.g., grub) is modified to reboot from the newly installed Domain0. Once the bootloader package has been modified accordingly, the controller 14 is rebooted.

After the controller 14 has been rebooted using the newly installed Domain0, the individual guest virtual machine (domU) images are installed to the respective LVM partitions identified by the volume label. Once the individual guest virtual machine (domU) images are installed, the domU virtual machines are relaunched or restarted from the newly installed version. Upon relaunch, once the virtual machines have completed the initialization process (i.e., start-of-day), the install process is committed. As shown in FIG. 5, the Staging area 38, which previously contained the solution bundle version X (see FIG. 4a), now contains the new solution bundle version Y. As part of the installation process, the new solution bundle version Y is moved to the scratch area carved out of the P-cache area 46. As part of committing the install process, the new solution bundle version Y is copied to the new Staging area 38.

Once the new firmware has been downloaded, the downloaded firmware is to be extracted as part of the firmware installation process. Referring now to FIG. 6, shown is a schematic view of the storage layout of the storage device 32 during and after the completion of firmware extraction from the new firmware solution bundle.

As discussed hereinabove, the P-cache area 46 within the storage device 32 is used as a scratch area to optimize space use within the storage device 32. Because this region is owned by the IOVM 24, this region first needs to be claimed by the Domain0 VM 22 to use this region as a scratch area for installation. The IOVM 24 components discover this particular storage device 32 through the front end block driver. The storage device 32 is to be made unavailable to the IOVM 24 by logically closing the connection to this storage device 32. Prior to making the storage device 32 unavailable to the IOVM 24, the write caching for all volumes in the IOVM 24 are disabled.

To extract the downloaded firmware, initially, the write caching for all volumes is disabled. That is, the volumes disable write caching and sync cache. Then, all volumes are transferred from the controller 14 to an alternate controller in the dual controller data storage array. Once all volumes are transferred from the controller 14 to an alternate controller, the back end block driver connection for the cache offload device is closed and the state of the hypervisor event channels used for communication is set to "closing."

Then, an event is sent to the front end driver. The event is trapped on the front end driver in the IOVM 24, and the cache offload device is disassociated by sending an event to the interested components in the firmware that the cache offload device is dissociated. Next, the front end state for the hypervisor event channel is moved to "closed," ensuring that the back end state for the cache offload device is "closed."

Next, the Domain0 VM 22 formats the cache offload area and mounts a temporary (ext3) file system. The solution bundle for the new firmware (e.g., version Y) then is copied to the cache offload area (shown generally as 62) and the individual RPM for each virtual machine is extracted. CRC verification then is performed on the individual packages. It should be noted that, at this stage, the cache offload area contains both the solution bundle and the extracted images (RPMs). All pre-install verifications are performed at this point. Once the pre-install checks have been performed, the steps of installing the new firmware can be performed.

Figure 7:
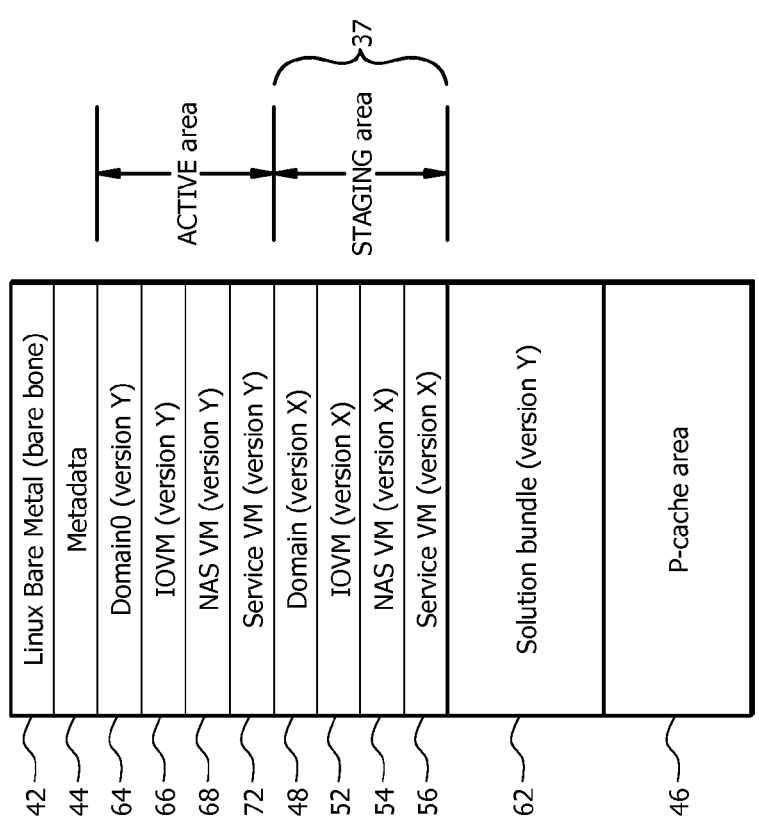
FIG. 7 is a schematic view of the storage layout of the storage device after the completion of the firmware installation.

Referring now to FIG. 7, shown is a schematic view of the storage layout of the storage device 32 after the completion the firmware installation. The installation process (of the activation phase) includes installing the new version of the firmware (version Y) for all of the virtual machines to their specified partitions or VBDs.

If the pre-install steps as discussed hereinabove have succeeded, then the Domain0 VM 22 proceeds to create partitions for each virtual machine within the specified region in the storage device 32. For example, the Domain0 VM 22 creates a first partition 64 for the new version of Domain0 VM 22, a second partition 66 for the new version of IOVM 24, a third partition 68 for the new version of NAS VM 26, and a fourth partition 72 for the new version of Service VM 28.

Based on the footprint of the image of the individual virtual machines as located within the cache offload area, LVM-backed partitions are created for the Domain0 VM 22 and all of the guest virtual machines. Once the LVM-backed partitions have been created, the install script uses the services of the UNIX-based disk dump utility (dd) to move the Hypervisor+Domain0 bootable image to the partition 64 designated for the new version of Domain0 VM 22. The current Staging area (shown as 38) now is marked as the Active area, while the Active area (shown as 37) now is marked as the Staging area. The install scripts change the bootloader (grub) to boot the Domain0 VM 22 from the newly installed image. The controller then is rebooted.

Once the Domain0 VM 22 boots up with the new firmware version (version Y), the Domain0 VM 22 copies the images for all of the guest virtual machines to their designated partitions by using the UNIX-based disk dump (dd) utility. The Domain0 VM 22 is rebooted before installing the other guest VMs so that the RPM database on the new Domain0 VM 22 is updated with RPM data of the newly installed packages (of the virtual machines). If the other virtual machines were installed prior to the Domain0 VM 22 rebooting with the new firmware version, the RPM database on the old Domain0 VM would have been updated. Once the guest virtual machines have been installed, the Domain0 VM 22 will spawn the guest VMs from the newly installed firmware and the modified bootloader (grub) file.

Once the IOVM 24 is in the process of booting up and executing its initialization sequence with the new firmware, the components managing the cache offload functionality discover the cache backup device. However, the device is not claimed by the components. The lower level component in the cache offload stack (dvc) does not send drive-ready events to the upper level components in the cache offload stack. Instead, the lower level component (dvc) keeps an in-memory state of the drive-ready events until the commit phase, which is described hereinbelow.

Each guest virtual machine notifies the Domain0 VM 22 on completion of its initialization sequence during boot. Once the IOVM 24 guest virtual machine comes back up, the firmware component managing the upgrade initiates the takeover of all volumes from the alternate controller. The component managing the installation then indicates to the peer controller to start extracting and installing the new firmware image.

Once the installation is complete and all of the virtual machines have successfully booted with the newly installed version of the firmware, the "system" initialization or start-of-day phase is considered to be complete. The system start-of-day completion is an event that indicates that the firmware upgrade is now complete for all virtual machines. This is also called the "commit" phase of the upgrade, wherein the new firmware version number is committed to the persistent storage in the native back-end drive set to indicate that the disk/storage array subsystem is now running with this new version.

Figure 8:
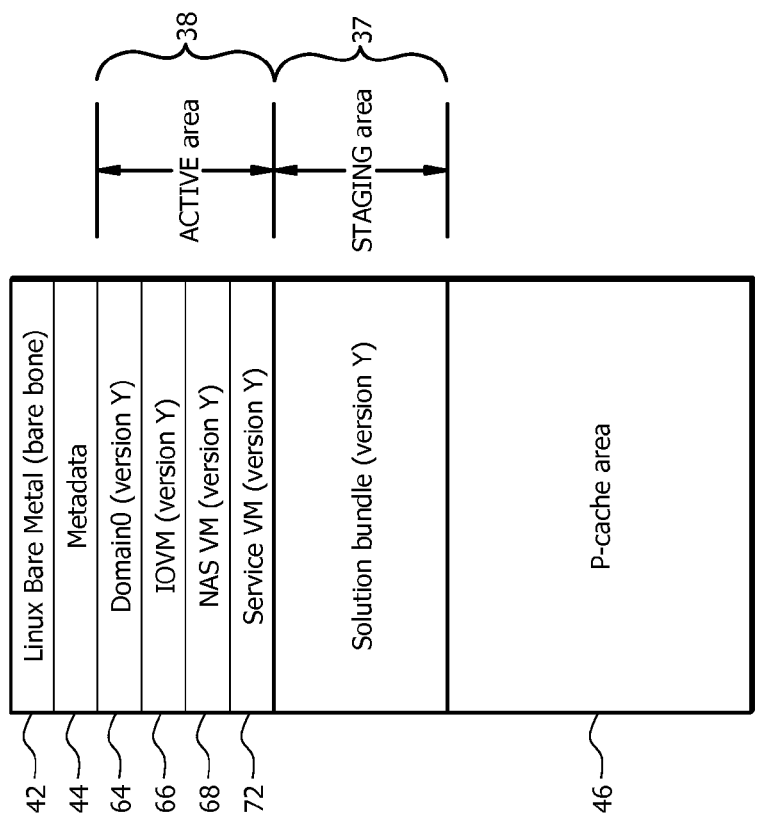
FIG. 8 is a schematic view of the storage layout of the storage device after committing to the firmware upgrade.

Referring now to FIG. 8, shown is a schematic view of the storage layout of the storage device 32 after committing to the firmware upgrade.

A number of actions are taken as part of the system initialization completion. First, the primary controller boots with the new firmware. Once all of the guest virtual machines complete their initialization sequence, the guest virtual machines notify the Domain0 VM 22 of the completion of their initialization sequence. When both controllers come up, the volumes are rebalanced.

The primary Domain0 VM or the Domain0 VM on the primary controller designated for the upgrade operation is responsible for coordinating with the alternate controller to ensure that all virtual machines have completed their respective initialization sequence. Once all of the guest virtual machines on both controllers have completed their initialization sequences (after booting with the new firmware), the Domain0 VM on both controllers repartitions their respective Staging areas to a single partition that will be managed by the Domain0 VM 22. After repartitioning the Staging area, the solution bundle (version Y) is copied from the cache offload area (shown as area 62 in FIG. 7) to the new Staging area (shown as area 37 in FIG. 8). This solution bundle is used for code synchronization purposes.

The cache offload area now can be claimed by the components managing the cache offload functionality. The download management component notifies the lower level components managing the cache offload (dvc) component to release the drive ready events to the components running within the Applications layer. Once this is complete, write caching is enabled for all volumes.

Referring now to FIG. 9A, shown is a schematic view of the storage layout of the storage device 32 after the completion of the firmware installation but before committing to the firmware upgrade. If any of the guest virtual machines are unable to complete their initialization process with the newly installed firmware (version Y), the newly installed firmware cannot be committed. In such case, a firmware rollback to the previously running version of the firmware (version X) is performed. The component managing the installation running on the Domain0 VM 22 of the primary controller waits for a timeout period from the time the Domain0 VM 22 on the primary controller completes its initialization. If all guest virtual machines do not complete their initialization within the specified time period, the component managing the installation initiates a rollback to the previously running version of firmware (version X).

If the timeout period expires and all guest virtual machines have not notified the primary Domain0 VM of start-of-day completion, the component managing the installation triggers a rollback operation. The rollback operation is performed one controller at a time and hence the volumes will be transferred to the alternate controller when one controller initiates a rollback operation.

The new Active area will again be marked as the Staging area and the new Staging area will be marked the Active area. Also, the bootloader (grub) will be modified to boot from the new Active area, which contains the previously running version of the firmware (version X). The controller then is rebooted.

Once the Domain0 VM boots from the previous version of the firmware (version X), the Domain0 VM also will spawn the guest virtual machines from the same version of the firmware (version X). Once all of the virtual machines complete the start-of-day operation with the previous version of the firmware (version X), the download management component on the Domain0 VM of both the controllers repartitions the storage device 32 to a single partition for the Staging area. The solution bundle for the new (unsuccessfully installed) firmware version (version Y) then is copied back to the Staging area. The cache offload area 46 then is reclaimed by the components managing the cache offload functionality in the IOVM. At this point, write caching then is enabled. Referring now to FIG. 9B, shown is a schematic view of the storage layout of the storage device 32 after a commit failure and a firmware rollback.

Figure 10:
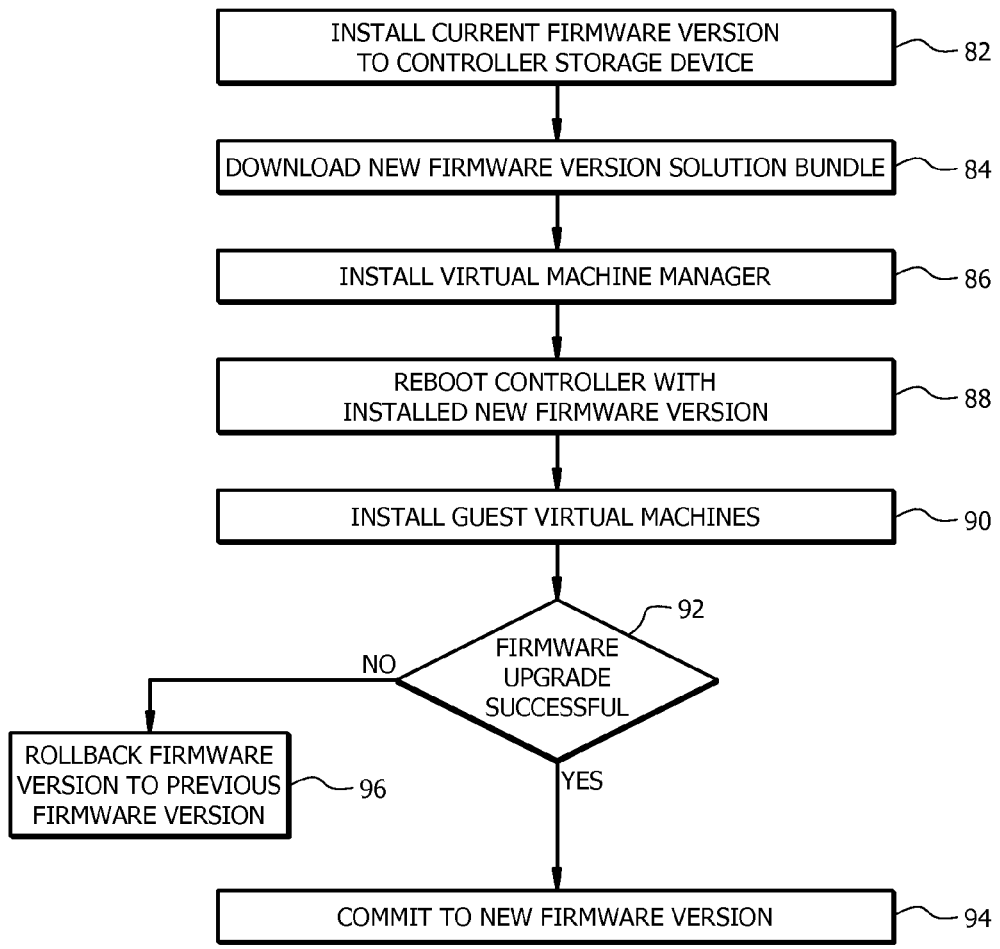
FIG. 10 is a block diagram of a method for a firmware upgrade with a firmware rollback capability of multiple storage applications within a storage virtualization environment according to embodiments of the invention.

Referring now to FIG. 10, shown is a block diagram of a method 80 for non-disruptive firmware upgrade with a firmware rollback capability of multiple storage applications within a storage virtualization environment according to embodiments of the invention. The method 80 includes a step 82 of installing a current firmware version to the storage device 32 within the controller 14. As discussed hereinabove and shown in FIG. 2, FIG. 3 and FIG. 4B, the Staging area 38 initially stores the current firmware version (version X) solution bundle. Also, the current firmware version extracted from the current firmware version solution bundle is installed in various partitions in the Active area 37, i.e., the code image for each virtual machine is stored in the corresponding virtual machine partition within the Active area 37.

The method 80 also includes a step 84 of downloading a new firmware version (version Y) solution bundle to the storage device 32. As discussed hereinabove and shown in FIG. 5, a new firmware version solution bundle is downloaded to the storage device 32 and stored in the Staging area 38.

The method 80 also includes a step 86 of installing the of installing the virtual machine manager. As discussed hereinabove and shown in FIG. 6 and FIG. 7, the new firmware version is extracted from the new firmware version solution bundle and stored in the appropriate partitions of the storage device 32. The installing step 86 includes moving the new firmware version solution bundle from the Staging area 38 to the scratch area 62 of the P-cache area 46 (FIG. 6). The installing step 86 includes extracting the new firmware version for the virtual machines from the new firmware version solution bundle. The installing step 86 also includes installing or copying the Domain VM firmware version to the partition 64 designated for the new version of Domain0 VM 22. The installing step 86 also includes marking the current Staging area 38 (FIG. 6) as the new Active area 38 (FIG. 7) and marking the current Active area 37 (FIG. 6) as the new Staging area 37 (FIG. 7).

The method 80 also includes a step 88 of rebooting the controller 14 with the installed new firmware version. As discussed hereinabove, the Domain0 VM 22 first is rebooted with the new firmware version, i.e., before installing the new firmware version to the guest virtual machines. Once the Domain0 VM 22 is rebooted with the new firmware version, the new firmware version is installed on the guest virtual machines and the guest virtual machines are relaunched using the installed new firmware version.

The method 80 also includes a step 90 of installing the firmware for the guest machines. This includes copying and installing the firmware for the guest machines to the appropriate partitions 64-72 in the Staging area 38 (FIG. 7) and spawning the guest virtual machines from the new firmware image.

The method 80 also includes a step 92 of determining whether the firmware upgrade for all of the virtual machines in the controller 14 is successful. As discussed hereinabove, if the firmware upgrade for all of the virtual machines in the controller 14 is successful (Y), the method 80 performs a step 94 of committing to the new firmware version. As discussed hereinabove and shown in FIG. 8, the committing step 94 includes repartitioning the new Staging area 37 as a single partition for the new firmware version solution bundle, and moving the new firmware version solution bundle from the scratch area 62 of the P-cache area 46 (FIG. 7) to the repartitioned Staging area 37 (FIG. 8). As discussed hereinabove, the new firmware version solution bundle overwrites the current/previous firmware version (version X) for the virtual machines.

However, if the firmware upgrade for any of the virtual machines in the controller 14 is not successful (N), the method 80 performs a step 96 of rolling back the firmware version for the virtual machines in the controller 14 to the previous firmware version (version X). As discussed hereinabove and shown in FIGS. 9A and 9B, the rollback step 96 includes marking the new Active area 38 (FIG. 9A) as the current Staging area 38 (FIG. 9B), marking the new Staging area 37 (FIG. 9A) as the current Active area 37 (FIG. 9B), and moving the new firmware version solution bundle from the scratch area 62 of the P-cache area 46 (FIG. 9A) to the current Staging area 38 (FIG. 9B).

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," and other similar words are not intended to limit the order of the steps. These words simply are used to guide the reader through the description of the exemplary method. Also, one of ordinary skill in programming will be able to write computer code or identify appropriate hardware and/or circuits to implement the disclosed invention without difficulty, based on the flow charts and associated description in this specification. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures, which may illustrate various process flows.

It should be understood that the methods according to embodiments of the invention can be used for all suitable OSA-based releases.

As discussed hereinabove, according to embodiments of the invention, the firmware upgrade process is performed with the data storage array online, i.e., is a non-disruptive process. That is, the storage array, which typically includes dual redundant storage controllers and a back-end drive set, is online and servicing requests from IO initiators during the firmware upgrade process. Such is made possible by failing over the volumes from one controller to the other (second) controller during the firmware upgrade of the first controller, upgrading the firmware for first controller, then failing back the volumes from the second controller to the first controller, upgrading the firmware for the second controller, and then redistributing the volumes once both the controllers have completed their respective firmware upgrades.

Figure 11:
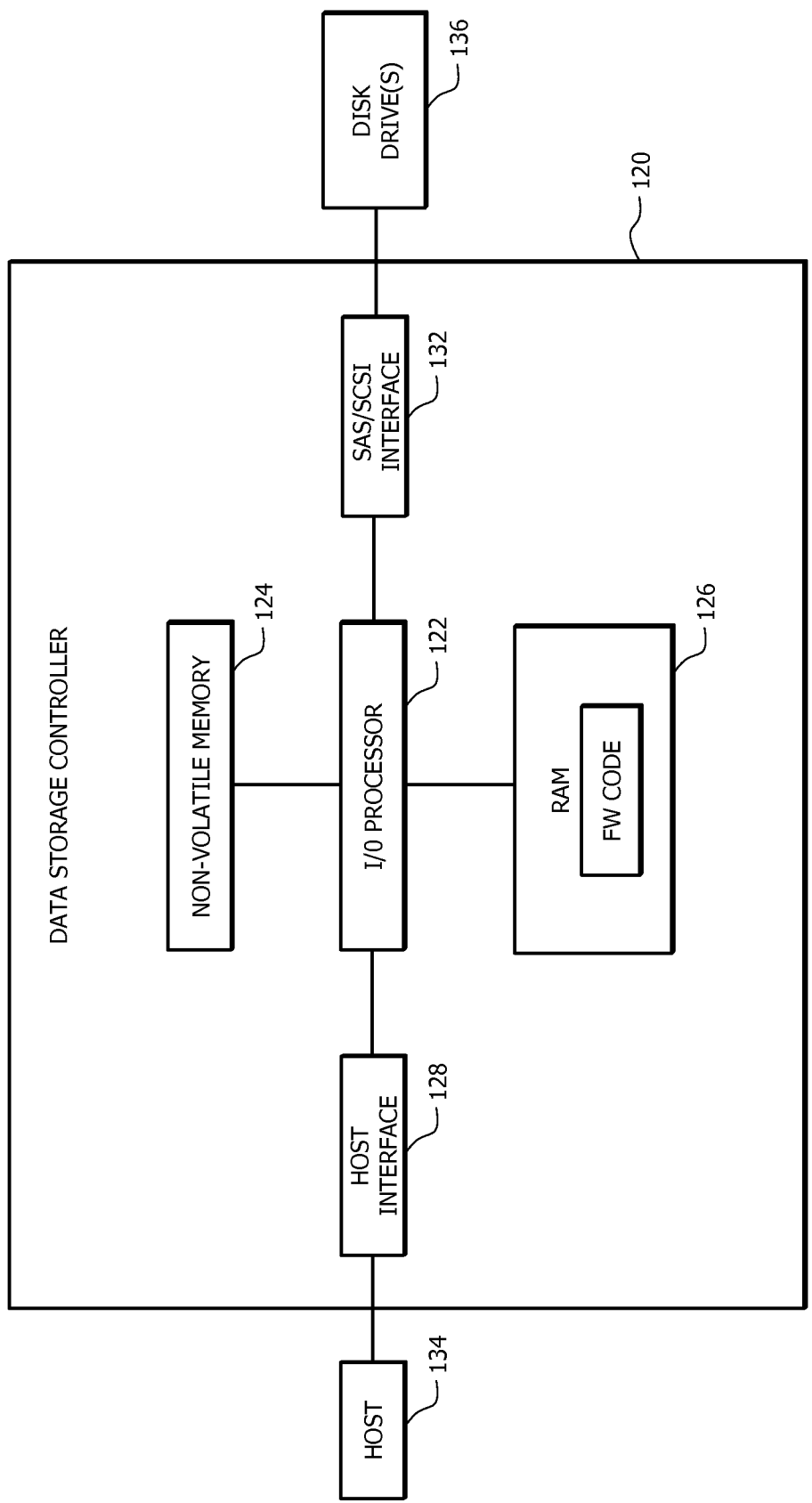
FIG. 11 is a schematic view of an apparatus for providing a firmware upgrade with a firmware rollback capability of multiple storage applications within a storage virtualization environment according to embodiments of the invention.

Referring now to FIG. 11, shown is a schematic view of a storage controller or controller device or apparatus 120 for providing a non-disruptive firmware upgrade with a firmware rollback capability of multiple storage applications within a storage virtualization environment according to embodiments of the invention. The storage controller 120, such as the storage controller 14 shown in FIG. 1, manages the operation of an associated data storage device, including reading data from and writing data to the data storage device. For example, the storage controller 120 processes requests from a host system attached thereto into appropriate requests to the data storage device. As discussed hereinabove, the data storage device can be a storage array, such as a Redundant Array of Inexpensive Disks (RAID) storage array.

The storage controller 120 includes an input/output (I/O) processor 122, a non-volatile memory element 124, a random access memory (RAM) element 126 typically having various data (including firmware code) at least temporarily stored therein, a front end or host interface 128, and one or more back end or data storage device interfaces 132, such as a Serial Attached SCSI (SAS)/SCSI interface. The host interface 128, which interfaces with a host system 134, allows communication between the storage controller 120 and the host system 134. The SAS/SCSI interface 132, which interfaces with one or more disk drives 136 or other data storage device, such as a RAID storage array, allows data communication between the storage controller 120 and the disk drives 136. Also, firmware code stored in one or more flash drive storage devices attached to the controller board of the storage controller 120 is loaded into the RAM element 126 for execution by one or more of the virtual machines.

The storage controller 120 can include any suitable conventional elements, such as microprocessors, memory and hard-wired logic, that in accordance with suitable programming or configuration logic allow the storage controller 120 to effect the functions or methods described herein, as well as any other suitable functions that persons skilled in the art understand are characteristic of conventional storage controllers. Such programming logic can be stored in the form of software or firmware that has been loaded into memory for execution by one or more processors, either on an as-needed or random-access basis or as firmware stored in non-volatile memory (e.g., programmable read-only memory).

One or more of the components within the storage controller 120, including the input/output (I/O) processor 122, the non-volatile memory element 124, the random access memory (RAM) element 126, the host interface 128, and the back end interfaces 132, can be comprised partially or completely of any suitable structure or arrangement, e.g., one or more integrated circuits. Also, it should be understood that the storage controller 120 includes other components, hardware and software (not shown) that are used for the operation of other features and functions of the storage controller 120 not specifically described herein.

The storage controller 120 can be partially or completely configured in the form of hardware circuitry and/or other hardware components within a larger device or group of components. Alternatively, the storage controller 120 can be partially or completely configured in the form of software, e.g., as processing instructions and/or one or more sets of logic or computer code. In such configuration, the logic or processing instructions typically are stored in a data storage device (not shown). The data storage device typically is coupled to a processor, such as the I/O processor 122. The processor accesses the necessary instructions from the data storage device and executes the instructions or transfers the instructions to an appropriate location within the storage controller 120.

As discussed hereinabove, the storage controller 120 typically is programmed with read-only memory (ROM) images that contain various firmware, e.g., one or more firmware images, such as a RAID firmware image. These firmware images include various sub-modules that are executed by various hardware portions of the storage controller during the operation of the storage controller 120. Alternatively, one or more of the firmware images, such as the RAID firmware image, can be stored on a flash device (e.g., the iSATA flash drive), and loaded into RAM for execution.

In one or more aspects, the functions described herein may be implemented in hardware, software, firmware, or any combination thereof. If implemented in software, the functions may be stored on or transmitted as one or more instructions or code on a non-transitory computer-readable medium. Non-transitory computer-readable media includes both computer storage media and communication media including any tangible medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for upgrading firmware in a virtualized storage environment that includes a controller having a first virtual machine manager, at least one second guest virtual machine and at least one storage device, wherein the at least one storage device includes a first logical area having stored therein a current firmware version solution bundle and marked as a Staging area, a second logical area having stored therein a current firmware version for the first virtual machine manager and the at least one second guest virtual machine and marked as an Active area, and a P-cache area, the method comprising:

moving the current firmware version solution bundle from the first logical area to the P-cache area;

downloading a new firmware version solution bundle to the first logical area;

installing in the first logical area a new firmware version for the first virtual machine manager and the at least one second guest virtual machine, wherein installing the new firmware version includes moving the new firmware version solution bundle from the first logical area to a scratch area carved out of the P-cache area, wherein moving the new firmware version solution bundle to the scratch area carved out of the P-cache area includes, prior to moving the new firmware version solution bundle to the scratch area carved out of the P-cache area, disabling write caching for storage volumes in a storage array external to the controller so that the P-cache area is not used by any quest virtual machines that use the P-cache area, logically disconnecting the storage device from the at least one quest virtual machine that uses the P-cache area, formatting the P-cache area using the first virtual machine manager, and mounting a temporary file system in the P-cache area using the first virtual machine manager, extracting from the new firmware solution bundle the new firmware version for the first virtual machine manager and the at least one second guest virtual machine, copying the new firmware version for the first virtual machine manager and the at least one second guest virtual machine from the scratch area carved out of the P-cache area to the first logical area, marking the first logical area as the Active area, and marking the second logical area as the Staging area;

rebooting the virtualized storage environment with the installed new firmware version;

committing to the new firmware version for the first virtual machine manager and the at least one second guest virtual machine if the installation of the new firmware version for the first virtual machine manager and the at least one second guest virtual machine is successful; and rolling back the firmware version from the new firmware version to the current firmware version for the first virtual machine manager and the at least one second guest virtual machine if the installation of the new firmware version for the first virtual machine manager and the at least one second guest virtual machine is not successful, wherein the firmware upgrading method allows data storage arrays coupled to the virtualized storage environment to remain operational and to provide access to hosts or initiators coupled to the storage arrays during the firmware upgrade.

2. The method as recited in claim 1, wherein installing the new firmware version in the first logical area includes creating a first partition in the first logical area for the new firmware version for the first virtual machine manager and creating at least one corresponding second partition in the first logical area for the new firmware version for the at least one second guest virtual machine, and wherein copying the new firmware version for the first virtual machine manager and the at least one second guest virtual machine to the first logical area includes moving the new firmware version for the first virtual machine manager to the first partition in the first logical area and moving the new firmware version for the at least one second guest virtual machine to the corresponding second partition in the first logical area.

3. The method as recited in claim 1, wherein extracting the new firmware version includes extracting new virtual machine images for the first virtual machine manager and the at least one second guest virtual machine, and wherein installing the new firmware version in the first logical area includes creating partitions and logical volumes in the first logical area for each of the virtual machines, installing the new virtual machine image for the first virtual machine manager to the logical volume for the first virtual machine manager, rebooting the virtualized storage environment from the new virtual machine image for the first virtual machine manager, installing the new virtual machine images for the at least one second guest virtual machine to the corresponding logical volume for the second guest virtual machines, and relaunching the at least one second guest virtual machine from the new virtual machine image for the at least one second guest virtual machine.

4. The method as recited in claim 1, wherein installing the new firmware version in the first logical area includes creating a first partition in the first logical area for the new firmware version for the first virtual machine manager and creating at least one corresponding second partition in the first logical area for the new firmware version for the at least one second guest virtual machine, and wherein moving the new firmware version for the first virtual machine manager and the at least one second guest virtual machine to the first logical area includes moving the new firmware version for the first virtual machine manager to the first partition in the first logical area, rebooting the virtualized storage environment using the new firmware version for the first virtual machine manager, and moving the new firmware version for the at least one second guest virtual machine to the corresponding second partition in the first logical area.

5. The method as recited in claim 1, wherein the second logical area includes a first partition for the current firmware version for the first virtual machine manager and at least one corresponding second partition for the at least one second guest virtual machine, and wherein committing to the new firmware version for the first virtual machine manager and the at least one second guest virtual machine includes repartitioning the second logical area as a single partition for the new firmware version solution bundle, and moving the new firmware version solution bundle from the scratch area carved out of the P-cache area to the second logical area in such a way that the new firmware version solution bundle overwrites the current firmware version for the first virtual machine manager and at least one second guest virtual machine.

6. The method as recited in claim 1, wherein the method includes installing the current firmware version to the storage device, wherein installing the current firmware version to the storage device includes copying a current firmware solution bundle to the first logical area of the storage device, extracting from the current firmware solution bundle the current firmware version for the first virtual machine manager and the at least one second guest virtual machine, creating in the second logical area of the storage device a first partition for first virtual machine manager and at least one second partition for the at least one second guest virtual machine, installing the current firmware version for the first virtual machine manager to the first partition, rebooting the virtualized environment, installing the current firmware version for the at least one second guest virtual machine to the corresponding second partition, marking the first logical area of the storage device as the Staging area, and marking the second logical area of the storage device as the Active area.

7. The method as recited in claim 1, wherein rolling back the firmware version from the new firmware version to the current firmware version includes marking the first logical area of the storage device as the Staging area, marking the second logical area of the storage device as the Active area, and moving the new firmware version solution bundle from the scratch area of the P-cache area to the first logical area in such a way that the new firmware version solution bundle overwrites the new firmware version for the first virtual machine manager and the at least one second guest virtual machine.

8. The method as recited in claim 1, wherein the first virtual machine is a Domain0 virtual machine, and wherein the at least one second virtual machine is an input/output virtual machine (IOVM), an NAS virtual machine (NAS VM) and a Service virtual machine (Service VM).

9. The method as recited in claim 1, wherein at least one of the storage devices in the first storage controller and the second storage controller is a flash drive.

10. A storage controller device, comprising:
an interface configured to couple the storage controller device to at least one data storage device; and
a processor coupled to the interface and configured to read data from and write data to the at least one data storage device,
wherein the storage controller device includes a controller that hosts a virtualized storage environment having a first virtual machine manager and at least one second guest virtual machine, and includes a storage device, wherein the at least one storage device includes a first logical area having stored therein a current firmware version solution bundle and marked as a Staging area, a second logical area having stored therein a current firmware version for the first virtual machine manager and the at least one second guest virtual machine and marked as an Active area, and a P-cache area,
wherein the storage controller device is configured to
moving the current firmware version solution bundle from the first logical area to the P-cache area;
download a new firmware version solution bundle to the first logical area;
install in the first logical area a new firmware version for the first virtual machine manager and the at least one second guest virtual machine, wherein installing the new firmware version includes
moving the new firmware version solution bundle from the first logical area to a scratch area carved out of the P-cache area, wherein moving the new firmware version solution bundle to the scratch area carved out of the P-cache area includes, prior to moving the new firmware version solution bundle to the scratch area carved out of the P-cache area, disabling write caching for storage volumes in a storage array external to the controller so that the P-cache area is not used by any quest virtual machines, logically disconnecting the storage device from the at least one guest virtual machine that uses the P-cache area, formatting the P-cache area using the first virtual machine manager, and mounting a temporary file system in the P-cache area using the first virtual machine manager,
extracting from the new firmware solution bundle the new firmware version for the first virtual machine manager and the at least one second guest virtual machine,
copying the new firmware version for the first virtual machine manager from the scratch area carved out of the P-cache area to the first logical area,
rebooting the virtualized storage environment with the installed first virtual machine manager
copying the at least one second guest virtual machine to the first logical area,
marking the first logical area as the Active area, and marking the second logical area as the Staging area;
commit to the new firmware version for the first virtual machine manager and the at least one second guest virtual machine if the installation of the new firmware version for the first virtual machine manager and the at least one second guest virtual machine is successful; and
rollback the firmware version from the new firmware version to the current firmware version for the first virtual machine manager and the at least one second guest virtual machine if the installation of the new firmware version for the first virtual machine manager and the at least one second guest virtual machine is not successful.

11. The device as recited in claim 10, wherein installing the new firmware version in the first logical area includes creating a first partition in the first logical area for the new firmware version for the first virtual machine manager and creating at least one corresponding second partition in the first logical area for the new firmware version for the at least one second guest virtual machine, and wherein copying the new firmware version for the first virtual machine manager and the at least one second guest virtual machine to the first logical area includes moving the new firmware version for the first virtual machine manager from the P-cache area to the first partition in the first logical area and moving the new firmware version for the at least one second guest virtual machine from the P-cache area to the corresponding second partitions in the first logical area.

12. The device as recited in claim 10, wherein extracting the new firmware version includes extracting new virtual machine images for the first virtual machine manager and the at least one second guest virtual machine, and wherein installing the new firmware version in the first logical area includes
creating partitions and logical volumes in the first logical area for each of the virtual machines,
installing the new virtual machine image for the first virtual machine manager to the logical volume for the first virtual machine manager,
rebooting the virtualized storage environment from the new virtual machine image for the first virtual machine manager,
installing the new virtual machine images for the at least one second guest virtual machine to the corresponding logical volume for the second guest virtual machines, and
relaunching the at least one second guest virtual machine from the new virtual machine image for the at least one second guest virtual machine.

13. The device as recited in claim 10, wherein installing the new firmware version in the first logical area includes creating a first partition in the first logical area for the new firmware version for the first virtual machine manager and creating at least one corresponding second partition in the first logical area for the new firmware version for the at least one second guest virtual machine, and wherein moving the new firmware version for the first virtual machine manager and the at least one second guest virtual machine to the first logical area includes
moving the new firmware version for the first virtual machine manager to the first partition in the first logical area,
rebooting the virtualized storage environment using the new firmware version for the first virtual machine manager, and
moving the new firmware version for the at least one second guest virtual machine to the corresponding second partition in the first logical area.

14. The device as recited in claim 10, wherein the second logical area includes a first partition for the current firmware version for the first virtual machine manager and at least one corresponding second partition for the at least one second guest virtual machine, and wherein committing to the new firmware version for the first virtual machine manager and the at least one second guest virtual machine includes repartitioning the second logical area as a single partition for the new firmware version solution bundle and moving the new firmware version solution bundle from the scratch area carved out of the P-cache area to the second logical area in such a way that the new firmware version solution bundle overwrites the current firmware version for the first virtual machine manager and at least one second guest virtual machine.

15. The device as recited in claim 10, wherein the storage controller device is configured to install the current firmware version to the storage device, wherein installing the current firmware version to the storage device includes
  copying a current firmware solution bundle to the first logical area of the storage device,
  extracting from the current firmware solution bundle a current firmware version for the first virtual machine manager and the at least one second guest virtual machine,
  creating in the second logical area of the storage device a first partition for first virtual machine manager and at least one second partition for the at least one second guest virtual machine,
  installing the current firmware version for the first virtual machine manager to the first partition,
  rebooting the virtualized environment,
  installing the current firmware version for the at least one second guest virtual machine to the corresponding second partition,
  marking the first logical area of the storage device as the Staging area, and
  marking the second logical area of the storage device as the Active area.

16. The device as recited in claim 10, wherein rolling back the firmware version from the new firmware version to the current firmware version includes
  marking the first logical area of the storage device as the Staging area,
  marking the second logical area of the storage device as the Active area, and
  moving the new firmware version solution bundle from the scratch area carved out of the P-cache area to the first logical area in such a way that the new firmware version solution bundle overwrites the new firmware version for the first virtual machine manager and the at least one second guest virtual machine.

17. The device as recited in claim 10, wherein the first virtual machine is a Domain0 virtual machine and wherein the at least one second virtual machine is an input/output virtual machine (IOVM), an NAS virtual machine (NAS VM) and a Service virtual machine (Service VM).

18. A non-transitory computer readable medium storing instructions that carry out a method for upgrading firmware in a virtualized storage environment that includes a first virtual machine manager, at least one second guest virtual machine and at least one storage device, wherein the at least one storage device includes a first logical area having stored therein a current firmware version solution bundle and marked as a Staging area, a second logical area having stored therein a current firmware version for the first virtual machine manager and the at least one second guest virtual machine and marked as an Active area, and a P-cache area, the method comprising:
  instructions for moving the current firmware version solution bundle from the first logical area to the P-cache area
  instructions for downloading a new firmware version solution bundle to the first logical area;
  instructions for installing in the first logical area a new firmware version for the first virtual machine manager and the at least one second guest virtual machine, wherein installing the new firmware version includes
    instructions for creating a scratch area within the P-cache area,
    instructions for moving the new firmware version solution bundle from the first logical area to the scratch area within the P-cache area, wherein moving the new firmware version solution bundle to the scratch area carved out of the P-cache area includes, prior to moving the new firmware version solution bundle to the scratch area carved out of the P-cache area, disabling write caching for storage volumes in a storage array external to the controller so that the P-cache area is not used by any guest virtual machines, logically disconnecting the storage device from the at least one guest virtual machine that uses the P-cache area, formatting the P-cache area using the first virtual machine manager, and mounting a temporary file system in the P-cache area using the first virtual machine manager,
    instructions for extracting from the new firmware solution bundle the new firmware version for the first virtual machine manager and the at least one second guest virtual machine,
    instructions for copying the new firmware version for the first virtual machine manager and the at least one second guest virtual machine from the scratch area carved out of the P-cache area to the first logical area,
    instructions for marking the first logical area as the Active area, and
    instructions for marking the second logical area as the Staging area;
  instructions for rebooting the virtualized storage environment with the installed new firmware version;
  instructions for committing to the new firmware version for the first virtual machine manager and the at least one second guest virtual machine if the installation of the new firmware version for the first virtual machine manager and the at least one second guest virtual machine is successful; and
  instructions for rolling back the firmware version from the new firmware version to the current firmware version for the first virtual machine manager and the at least one second guest virtual machine if the installation of the new firmware version for the first virtual machine manager and the at least one second guest virtual machine is not successful.

* * * * *